United States Patent
Lee

(10) Patent No.: US 10,635,333 B2
(45) Date of Patent: Apr. 28, 2020

(54) MEMORY SYSTEM

(71) Applicant: SK hynix Inc., Gyeonggi-do (KR)

(72) Inventor: Jun-Seo Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 213 days.

(21) Appl. No.: 15/703,175

(22) Filed: Sep. 13, 2017

(65) Prior Publication Data

US 2018/0210669 A1    Jul. 26, 2018

(30) Foreign Application Priority Data

Jan. 23, 2017 (KR) .......................... 10-2017-0010495

(51) Int. Cl.
| | |
|---|---|
| *G06F 13/00* | (2006.01) |
| *G06F 3/06* | (2006.01) |
| *G06F 13/28* | (2006.01) |
| *G06F 13/42* | (2006.01) |

(52) U.S. Cl.
CPC .......... *G06F 3/0629* (2013.01); *G06F 3/0613* (2013.01); *G06F 3/0619* (2013.01); *G06F 3/0625* (2013.01); *G06F 3/0661* (2013.01); *G06F 3/0679* (2013.01); *G06F 3/0683* (2013.01); *G06F 13/28* (2013.01); *G06F 13/4282* (2013.01); *Y02D 10/14* (2018.01); *Y02D 10/151* (2018.01)

(58) Field of Classification Search
CPC combination set(s) only.
See application file for complete search history.

(56) References Cited

U.S. PATENT DOCUMENTS

| | | | | |
|---|---|---|---|---|
| 2005/0027951 A1* | 2/2005 | Piccirillo | ................. | G11C 5/04 711/154 |
| 2009/0182918 A1* | 7/2009 | Hollis | ................. | G06F 13/4234 710/106 |
| 2010/0002504 A1* | 1/2010 | Kim | ..................... | G11C 7/1006 365/185.03 |
| 2010/0287427 A1* | 11/2010 | Kim | ....................... | G11C 16/10 714/721 |
| 2013/0132703 A1* | 5/2013 | Narum | .................... | G06F 12/10 711/206 |

(Continued)

FOREIGN PATENT DOCUMENTS

KR    1020140113101    9/2014

*Primary Examiner* — Ilwoo Park
(74) *Attorney, Agent, or Firm* — IP & T Group LLP

(57) ABSTRACT

A memory system includes: a non-volatile memory device for including a first storage region and a second storage region; and a controller for including first and second interfaces for inputting/outputting a data to/from a host, inputting/outputting a first data of the first storage region through the first interface, and inputting/outputting a second data of the second storage region through the second interface, wherein when the first data is programmed in the first storage region, the controller detects a value of the first data, selectively inverts the value of the first data based on the detection result, and program a resultant value, and when the second data is programmed in the second storage region, the controller detects a state of the second storage region where the second data is programmed, selectively inverts a value of the second data based on the state detection result, and program a resultant value.

16 Claims, 13 Drawing Sheets

(56) References Cited

U.S. PATENT DOCUMENTS

| | | |
|---|---|---|
| 2015/0254003 A1 | 9/2015 | Lee et al. |
| 2015/0255130 A1 | 9/2015 | Lee et al. |
| 2016/0203091 A1* | 7/2016 | Lee .................... G06F 13/1673 710/105 |
| 2018/0052724 A1 | 2/2018 | Lee |

* cited by examiner

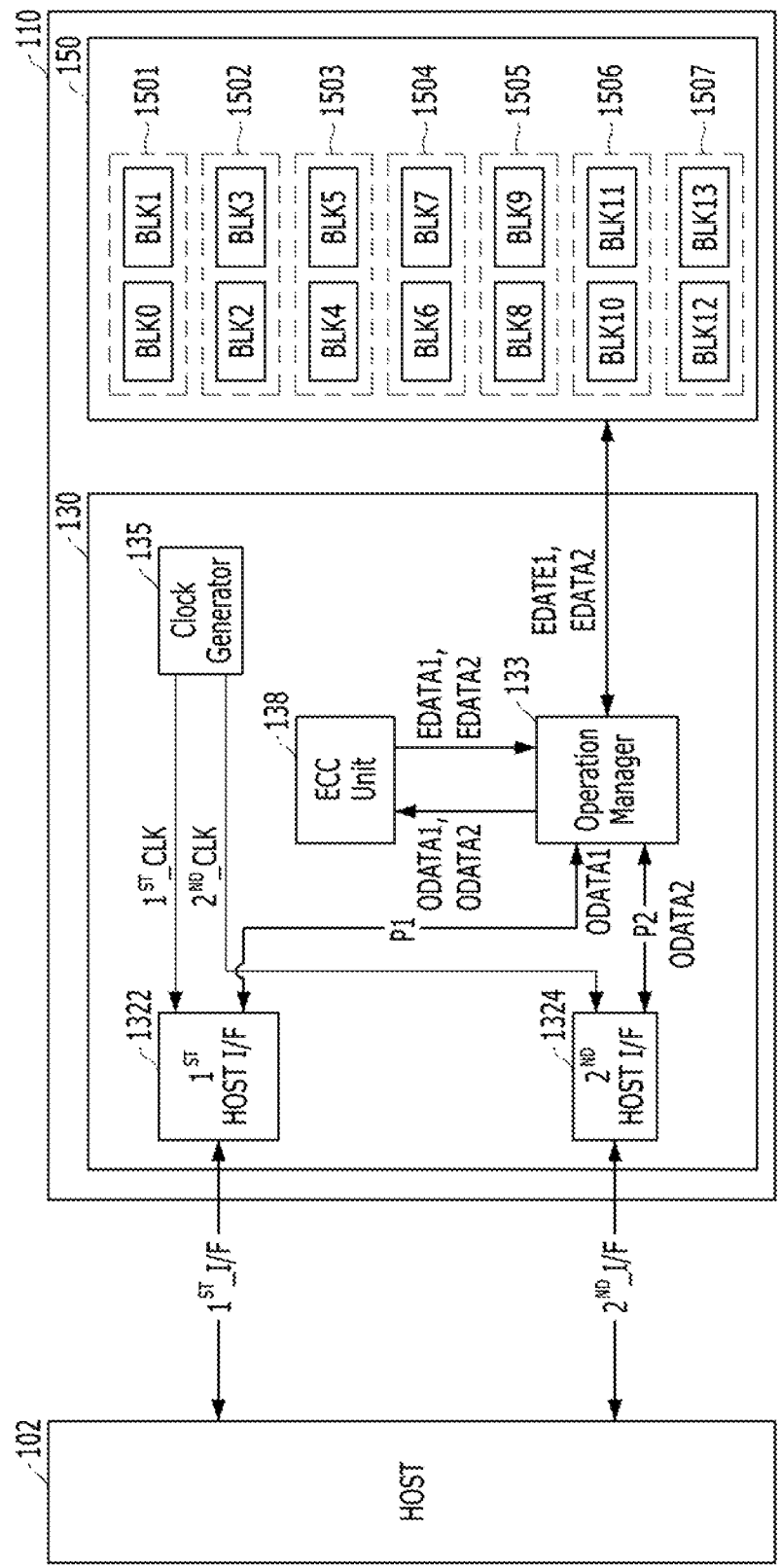

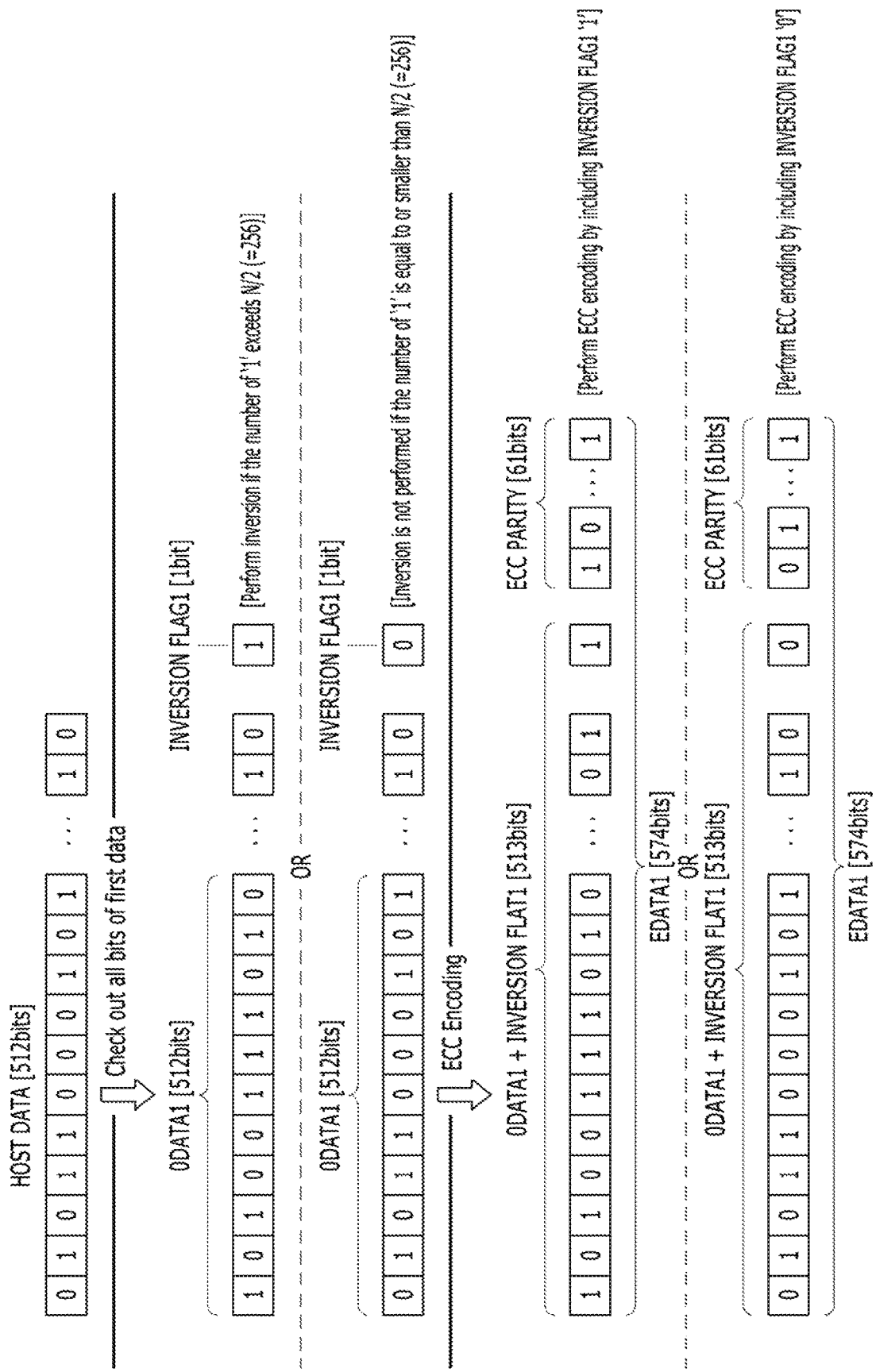

| case | Number of cells where stuck bits coincide with bits to be stored | Number of cells where stuck bits do not coincide with bits to be stored | Error bits detected from 1st verification operation | | Error bits detected from 2nd verification operation |
|---|---|---|---|---|---|
| 1 | 0 | 11 | 11 | | 0 |
| 2 | 1 | 10 | 10 | | 1 |
| 3 | 2 | 9 | 9 | Inverted | 2 |
| 4 | 3 | 8 | 8 | | 3 |
| 5 | 4 | 7 | 7 | | 4 |
| 6 | 5 | 6 | 6 | | 5 |
| 7 | 6 | 5 | 5 | | |
| 8 | 7 | 4 | 4 | | |
| 9 | 8 | 3 | 3 | Not Inverted | |
| 10 | 9 | 2 | 2 | | |
| 11 | 10 | 1 | 1 | | |
| 12 | 11 | 0 | 0 | | |

MEMORY SYSTEM

CROSS-REFERENCE TO RELATED APPLICATIONS

The present application claims priority of Korean Patent Application No. 10-2017-0010495, filed on Jan. 23, 2017, which is incorporated herein by reference in its entirety.

BACKGROUND

1. Field

Exemplary embodiments of the present invention relate to a semiconductor technology and, more particularly, to a memory system including a non-volatile memory device.

2. Description of the Related Art

The computer environment paradigm has changed to ubiquitous computing systems that can be used anytime and anywhere. Due to this fact use of portable electronic devices such as mobile phones, digital cameras, and notebook computers has rapidly increased. These portable electronic devices generally use a memory system having one or more memory devices for storing data. A memory system may be used as a main or an auxiliary memory of a portable electronic device.

Memory systems provide excellent stability, durability, high information access speed, and low power consumption since they have no moving parts. Examples of memory systems having such advantages include universal serial bus (USB) memory devices, memory cards having various interfaces and solid state drives (SSD).

SUMMARY

Embodiments of the present invention are directed to a memory system including a non-volatile memory device.

In accordance with an embodiment of the present invention, a memory system includes: a non-volatile memory device including a first storage region and a second storage region; and a controller including a first interface and a second interface for transferring a data between a host and the non-volatile memory device, and suitable for transferring a first data between the first storage region and the host through the first interface, and transferring a second data between the second storage region and the host through the second interface, the controller may program the first data into the first storage region by selectively inverting the first data according to bit values of the first data, and the controller may program the second data into the second storage region by selectively inverting the second data according to status of memory cells in the second storage region, into which the second data is programmed.

The controller may program the first data into the first storage region by inverting the first data when bits having a first value are a majority in the first data.

The controller may program the first data into the first storage region by further adding a first flag bit to the first data, and the first flag bit may represent the inversion of the first data.

The controller may further read the stored first data from the first storage region by selectively inverting the read first data according to the first flag bit added to the read first data.

The controller may further check the status of the memory cells in the second storage region by: programming the second data into the second storage region without the inversion of the second data; reading the stored second data from the second storage region; and comparing the second data at the time of the programming with the read second data. The controller may further decide whether to invert the second data according to a number of different bits between the second data at the time of the programming and the read second data.

The controller may end the programming of the second data when the number of different bits is equal to or less than a predetermined threshold.

The controller may program the second data into the second storage region by inverting the second data when the number of different bits exceeds the predetermined threshold.

The controller may further read the inverted and stored second data from the second storage region, and may further compare the inverted second data at the time of the programming with the read inverted second data and the controller may decide the programming of the inverted second data as successful when a number of different bits between the inverted second data at the time of the programming and the read inverted second data is equal to or less than the predetermined threshold.

The controller may program the second data into the second storage region by further adding a second flag bit to the second data, and the second flag bit may represent the inversion of the second data.

The controller may further read the stored second data from the second storage region by selectively inverting the read second data according to the second flag bit added to the read second data.

The controller may further check a status of the first storage region at a predetermined cycle or at an occurrence of a predetermined event, and may further variably change storage capacities of the first and second storage regions based on a result of the checking of the status of the first storage region.

Each of the first and second storage region may include a plurality of storage segments. The controller may assign one or more degraded storage segments of the first storage region as the second storage region, and the degraded storage segment may be one, data read from which has greater number of errors than a threshold number of errors.

The controller may assign one or ore improved storage segments of the second storage region as the first storage region, and the improved storage segment may be one, data read from which has less number of errors than the threshold number of errors.

The controller may include: a clock generator suitable for generating a first dock having a relatively high frequency and a second clock having a relatively low frequency; and a transferor suitable for inputting/outputting an input/output data of the first storage region to/from the host through the first interface that operates in response to the first clock, and inputting/outputting an input/output data of the second storage region to/from the host through the second interface that operates in response to the second clock.

The first storage region may be a main memory of the host, and the second storage region may be a storage of the host.

The first interface may be one interface among a Dual In-line Memory Module (DIMM) interface and a Peripheral Component Interconnect Express (PCI-e) interface, and the second interface may be one interface among a Dual In-line Memory Module (DIMM) interface and a Peripheral Component Interconnect Express (PCI-e) interface.

The non-volatile memory device may be one memory selected from a group including a flash memory, a Phase Change Random Access Memory (PCRAM), a Resistive Random Access Memory (RRAM), a ferroelectric random access memory (FRANC), and a Spin Transfer Torque Random Access Memory (STT-MRAM).

BRIEF DESCRIPTION OF THE DRAWINGS

These and other features and advantages of the present invention will become apparent to those skilled in the art to which the present invention pertains from the following detailed description in reference to the accompanying drawings, wherein:

FIG. 5 is a block diagram illustrating the memory system shown in FIG. 1;

FIG. 6 illustrates a process of storing a data through a first path in the memory system shown in FIG. 5;

DETAILED DESCRIPTION

Figure 1:
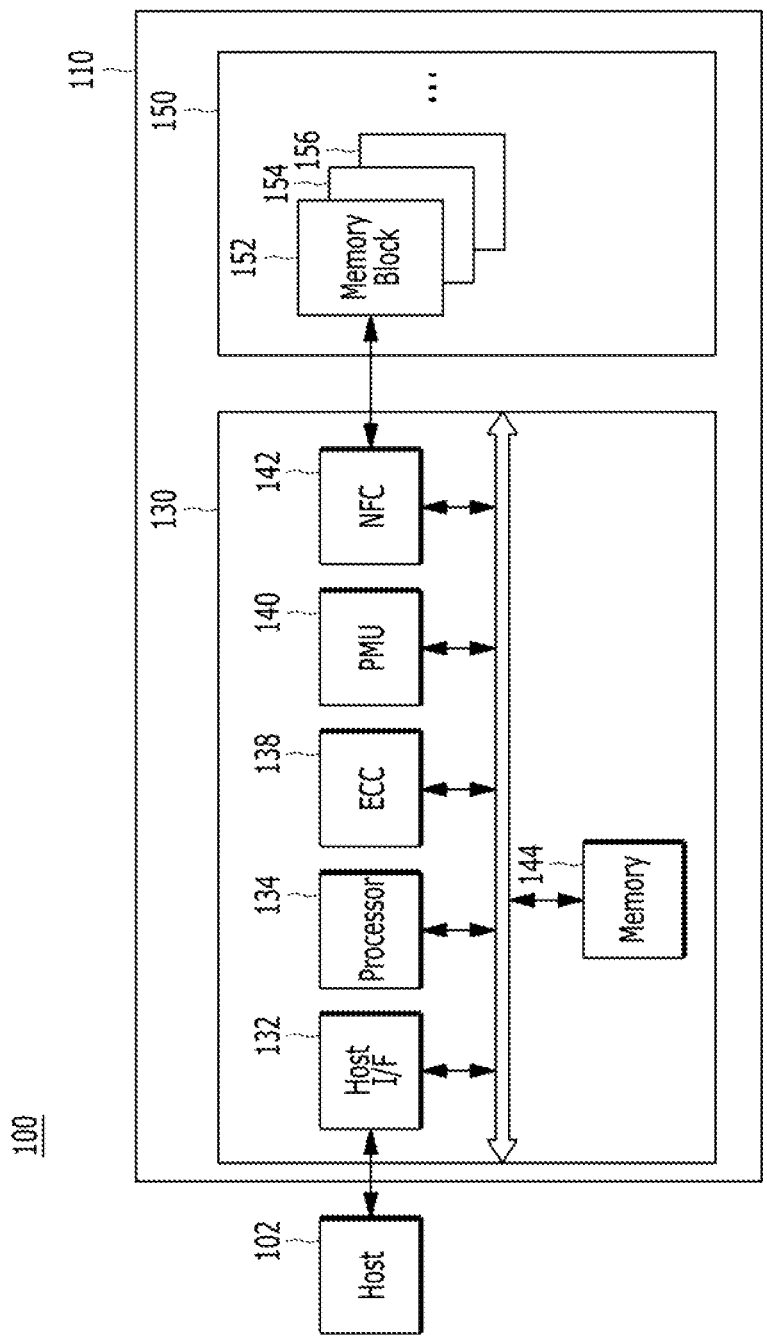
FIG. 1 is a block diagram illustrating a data processing system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of tie present invention.

It will be understood that, although the terms "first", "second", "third" and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to dearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context dearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. II be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM)/an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

the controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown) each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140 a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102 may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
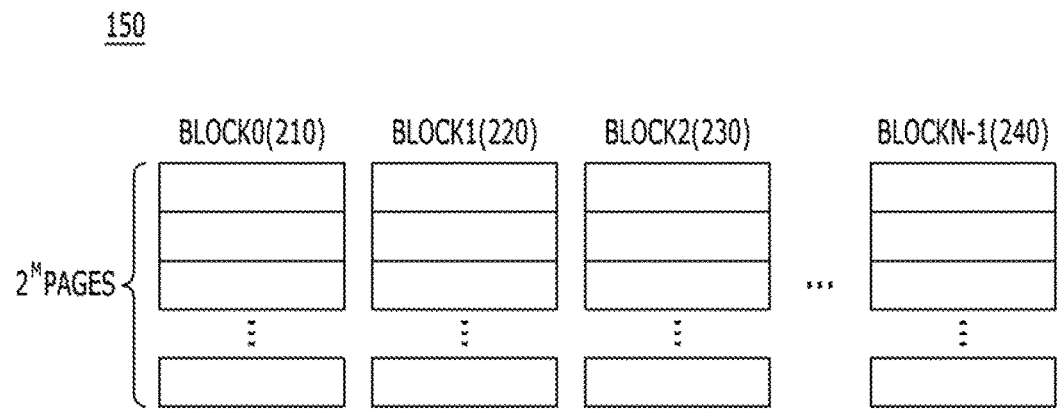
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1 and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
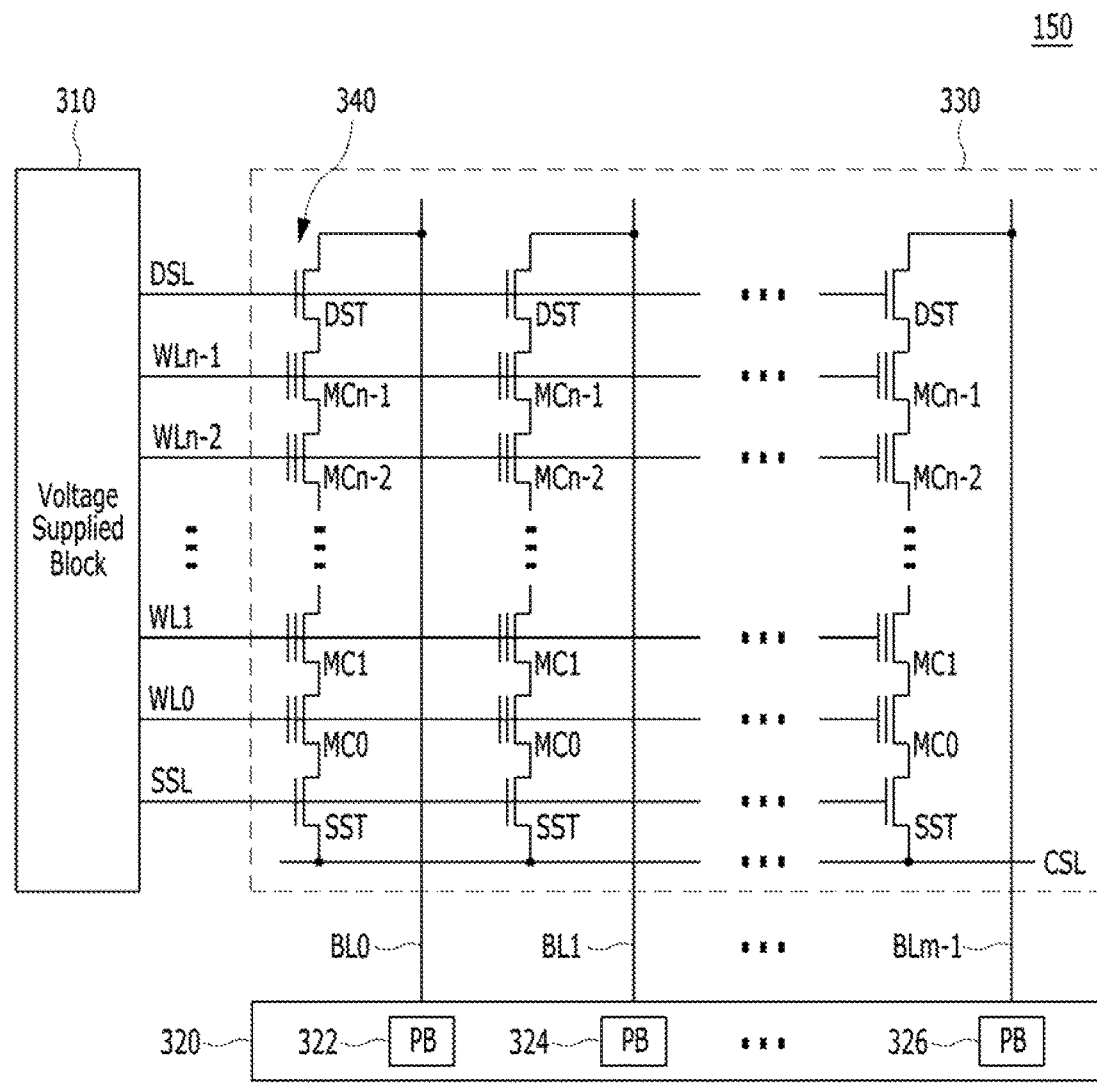
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
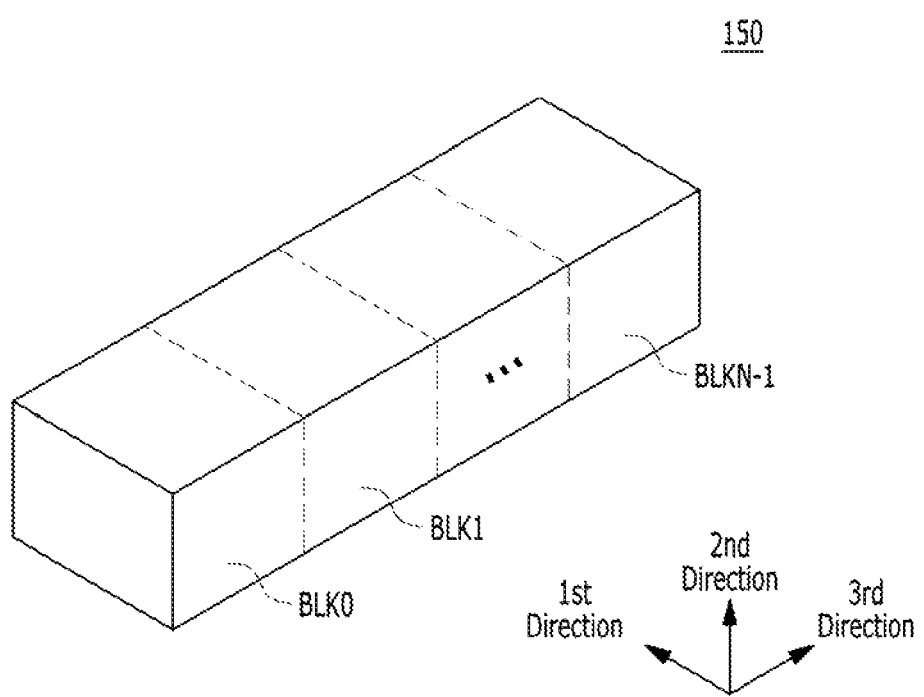
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each of the memory blocks having a 3D structure (or vertical structure).

FIG. 5 is a block diagram illustrating further elements of the memory system 110.

FIG. 6 illustrates a process of storing a data through a first path in the memory system 110.

Figure 7A:
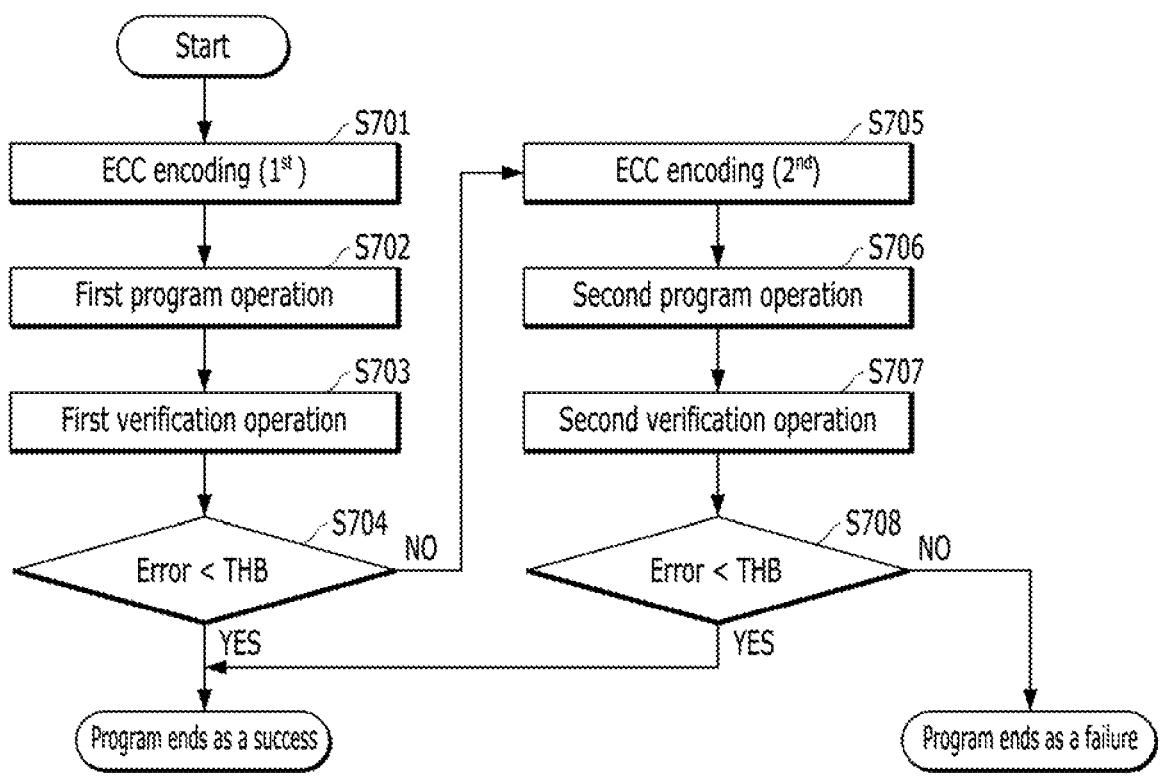
FIGS. 7A to 7C illustrate a process of storing a data through a second path in the memory system shown in FIG. 5.
Figure 7B:
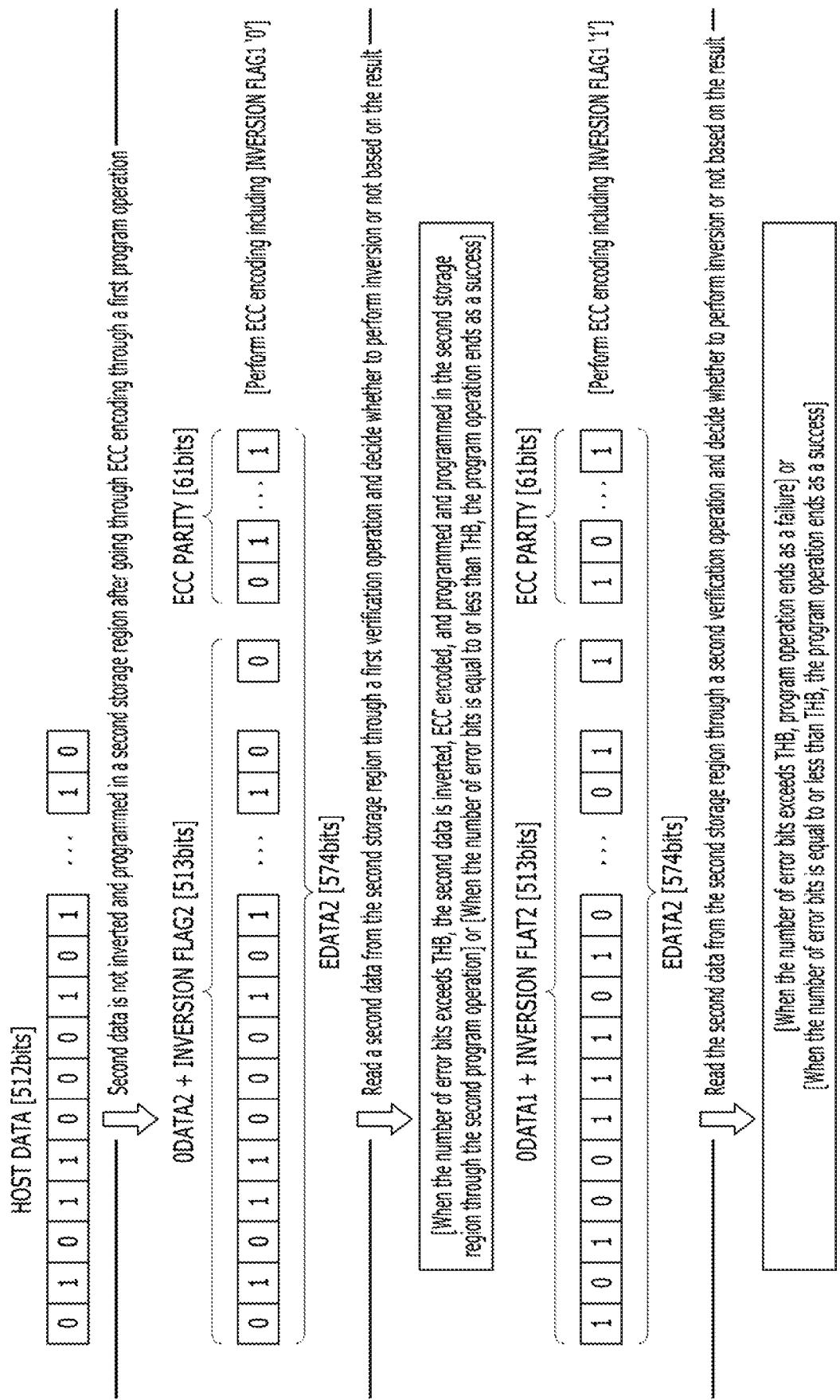
Figures 7C, 8:
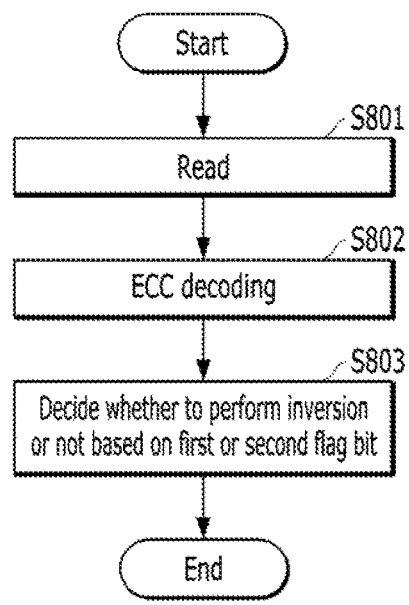
FIG. 8 is a flowchart describing a process of reading a data in the memory system shown in FIG. 5.

FIGS. 7A to 7C illustrate a process f storing a data through a second path in the memory system 110.

FIG. 8 is a flowchart describing a process of reading data in the memory system 110.

Referring to FIG. 5, the memory system 110 may include the non-volatile memory device 150 and the controller 130.

Examples of suitable non-volatile memory devices 150 may include a flash memory, a Phase Change Random Access Memory (PCRAM), a Resistive Random Access Memory (RRAM), a ferroelectric random access memory (FRAM) and a Spin Transfer Torque Random Access Memory (STT-MRAM). However, the concept and spirit of the present invention is not limited in this way and other nonvolatile memories may be used. In an embodiment, the non-volatile memory device 150 is a Phase Change Random Access Memory (PCRAM).

The non-volatile memory device 150 may include a first storage region and a second storage region. The respective storage capacities of the first and second storage regions may be variable. For example, a variable number of the memory blocks BLK<0:13> which are shown as being included in the memory device 150 may be assigned as the first storage region, whereas the remaining memory blocks of the memory blocks BLK<0:13> may be assigned as the second storage region.

The controller 130 may check out the state of the non-volatile memory device 150 at a predetermined cycle or whenever a preset event occurs, and may variably assign some memory blocks as the first storage region and the other memory blocks as the second storage region among the memory blocks BLK<0:13> based on the checked state of the nonvolatile memory device 150.

In an embodiment, the controller 130 may manage the first storage region (e.g. $0^{th}$ to $11^{th}$ memory blocks BLK<0:11>) as one or more of first divided storage regions 1501 to 1506 and the second storage region (e.g., $12^{th}$ and $13^{th}$ memory blocks BLK<12:13>) as one or more second divided storage regions 1507, may select at least one of the first divided storage regions (e.g., the first divided storage region 1506 including $10^{th}$ and $11^{th}$ memory blocks BLK<10:11>) to store data whose number of error bits exceeds a predetermined number at the predetermined cycle, and assign the selected at least one first divided storage region 1506 to the second storage region so that the storage regions 1506 and 1507 may be managed as the second storage region.

In an embodiment, the controller 130 may manage the first storage region (e.g., $0^{th}$ to ninth memory blocks BLK<0: 9>) as a plurality of first divided storage regions 1501 to 1505 and the second storage region (e.g., $10^{th}$ and $13^{th}$ memory blocks BLK<10:13>) as a plurality of second divided storage regions 1506 and 1507, select at least one second divided storage region (e.g., the second divided storage region 1507 including $12^{th}$ and $13^{th}$ memory blocks BLK<12:13>) to store data whose number of error bits is less than a predetermined number at the predetermined cycle, and assign the selected at least one second divided storage region (e.g., the second divided storage region 1507) to the first storage region so that the storage regions 1501 to 1505 and 1507 may be managed as the first storage region. Hence, the controller 130 may re-allocate one or more first or second divided storage regions from one region to the other.

First and second interfaces 1ST_I/F and 2ND_I/F may be provided for facilitating data communication between the controller 130 and the host 102. The controller 130 may transfer a first data ODATA1 or EDATA1 between the first storage region and the host 102 through the first interface 1ST_I/F, and may transfer a second data ODATA2 or EDATA2 between the second storage region and the host 102 through the second interface 2ND_I/F.

The controller 130 may include a first host interface 1322, a second host interface 1324, an operation manager 133, a clock generator 135 as well as the ECC unit 138.

Herein, the operation manager 133 may transfer the first data ODATA1 or EDATA1 between the first storage region and the first host interface 1322 through a first path P1 in order to transfer the first data ODATA1 or EDATA1 between the first storage region and the host 102 through the first interface 1ST_I/F coupled to the first host interface 1322. Also, the operation manager 133 may transfer the second data ODATA2 or EDATA2 between the second storage region and the second host interface 1324 through a second path P2 in order to transfer the second data ODATA2 or EDATA2 between the second storage region and the host 102 through the second interface 2ND_I/F coupled to the second host interface 1324.

The operation manager 133 may identify data read from or to be written into the first and second storage regions. The identified data may be one of the first data ODATA1 or EDATA1 and the second data ODATA2 or EDATA2 according to the identification.

For example, the operation manager 133 may transfer a data, which is read from or to be written into the first storage region, between the first storage region and the host 102 through the first host interface 1322 and the first path P1. The data related with the first storage region may be the first data ODATA1 or EDATA1. For example, the operation manager 133 may transfer a data, which is read from or to be written into the second storage region, between the second storage region and the host 102 through the second host interface 1324 and the second path P1. The data related with the second storage region may be the second data ODATA2 or EDATA2.

When the memory device 150 has a good status, for example, when memory cells of the memory device 150 have small values of the program/erase cycles thereof, the controller 130 may assign more memory blocks as the first storage region than as the second storage region among the memory blocks BLK<0:13> for greater storage capacity of the first storage region than the second storage region.

The clock generator 135 may generate a first clock 1ST_CLK and a second clock 2ND_CLK of different frequencies. For example, the first clock 1ST_CLK may have a higher frequency than the second clock 2ND_CLK.

The first and second clocks 1ST_CLK and 2ND_CLK may be provided to the first and second host interfaces 1322 and 1324, respectively. Therefore, the first data ODATA1 or EDATA1 and the second data ODATA2 or EDATA2 may be transferred between the host 102 and the controller 130 at different speed according to the respective frequencies of the first and second clocks 1ST_CLK and 2ND_CLK. For example, the first data ODATA1 or EDATA1 may be transferred at higher speed than the second data ODATA2 or EDATA2 when the first clock 1ST_CLK has a higher frequency than the second clock 2ND_CLK does.

In an embodiment, the first interface 1ST_I/F is a Dual In-line Memory Module (DIMM) interface and the second interface 2ND_I/F is a Peripheral Component Interconnect Express (PCI-e) interface. In another embodiment, the first interface 1ST_I/F is a Dual In-line Memory Module (DIMM) interface and the second interface 2ND_I/F is a DIMM interface. In yet another embodiment, the first interface 1ST_I/F is a Peripheral Component Interconnect Express (PCI-e) interface and the second interface 2ND_I/F is a PCI-e interface. In yet another embodiment the first interface 1ST_I/F is a Peripheral Component Interconnect Express (PCI-e) interface and the second interface 2ND_I/F is a DIMM interface. In an embodiment, the first storage region may serve as a main memory device of the host 102 such as a Dynamic Random Access Memory (DRAM), and the second storage region may serve as a storage device of the host 102 such as a NAND flash memory.

As described above, in the memory system 110 in accordance with an embodiment of the present invention, a single non-volatile memory device 150 may serve both as the main memory device of the host 102 and as the storage device of the host 102 at the same time.

The size of the region used as the main memory device of the host 102 and the size of the region used as the storage device of the host 102 in the non-volatile memory device 150 may be variably controlled in the memory system 110, for example, in accordance with the status of the memory device 150.

The controller 130 may check out the value of the first data ODATA1 or EDATA1 and selectively invert the first data ODATA1 or EDATA1 based on the value of the first data ODATA1 or EDATA1 and program the selectively inverted data in the first storage region.

To be specific, for this operation of the controller 130, when the first data ODATA1 or EDATA1 which inputted from the host 102 through the first host interface 1322 is programmed in the first storage region of the non-volatile memory device 150 through the first host interface 1322, the operation manager 133 may check out whether the number of the bits having a first logic value is a majority of the first data ODATA1 or EDATA1, invert all the bits of the first data ODATA1 or EDATA1 selectively based on the check-out result and program the selectively inverted data in the first storage region of the non-volatile memory device 150.

For example, referring to FIG. 6, it is exemplified that 512 bits of data HOST DATA [512 bits] is inputted from the host 102 to the memory system 110 through the first interface 1ST_I/F.

The 512 bits of data HOST DATA [512 bits] inputted to the first host interface 1322 of the memory system 110 through the first interface 1ST_I/F may be transferred to the operation manager 133 as a first data ODATA1 [512 bits] through the first path P1.

The operation manager 133 may check out the value of the first data ODATA1 [512 bits]. In other words, the operation manager 133 may check out whether the number of the bits having a first logic value is a majority of the first data ODATA1 [512 bits].

As illustrated in the drawing the operation manager 133 may check out whether the number of the bits having a logic value 1' is the majority of the first data ODATA1 [512 bits].

In the case, where the memory device 150 is a PCRAM, it generally takes more power to program a value '1' than to program a value '0'. For example, when first data ODATA1 [512 bits] is programmed in the PCRAM serving as the memory device 150, if the number of data having a value '1' is decreased, the amount of power consumption may be decreased. Therefore, when the first data DATA [512 bits] is programmed in the first storage region in the PCRAM serving as the memory device 150 the number of the bits having a value 1 among the total number of the bits included in the first data ODATA1 [512 bits] may be checked out to reduce power consumption.

The first logic value may be a value '0' according to the option of a designer.

After checking out whether the number of the bits having a first logic value is the majority of the first data ODATA1 [512 bits], the operation manager 133 may determine whether to invert the first data ODATA1 [512 bits] or not. In other words, as illustrated in the drawing, when the number of the bits having a value '1' is the majority of the first data ODATA1 [512 bits], the operation manager 133 may invert the first data ODATA1 [512 bits] Conversely, when the number of the bits having a value '1' is a minority of the first data ODATA1 [512 bits], the operation manager 133 may not invert the first data ODATA1 [512 bits].

In this way, the operation manager 133 may selectively invert the first data ODATA1 [512 bits]. Herein, the operation manager 133 may include information INVERSION FLAG1 [1 bit] for representing whether the first data ODATA1 [512 bits] is an inverted data or not in the first data ODATA1 [512 bits].

That is, when the number of the bits having a value '1' is a majority of the first data ODATA1 [512 bits], the operation manager 133 may invert the first data ODATA1 [512 bits] and add the generated first flag bit INVERSION FLAG1 [1 bit], which represents the inversion of the first data ODATA1 [512 bits] to the first data ODATA1 [512 bits]. Conversely, when the number of the bits having a value '1' is a minority of the first data ODATA1 [512 bits], the operation manager 133 may not invert the first data ODATA1 [512 bits] and add the generated first flag bit INVERSION FLAG1 [1 bit], which represents no-inversion of the first data ODATA1 [512 bits], to the first data ODATA1 [512 bits].

The ECC unit 138 may perform an ECC encoding operation for generating ECC parity bits ECC PARITY [61 bits] for a data to be programmed in the non-volatile memory device 150.

The ECC unit 138 may perform the ECC encoding operation onto the first data ODATA1 [512 bits] and the first flag bit INVERSION FLAG1 [1 bit].

In an embodiment, information representing a number of bits having a first logic value may be further added to the first data ODATA1 [512 bits].

For example, when a size of one page in a PCRAM is 64 bits and a size of the encoded first data EDATA1 [574 bits] is 574 bits, a total of 9 pages may be required to store the encoded first data EDATA1 [574 bits] with two bits left empty. In this case, 2-bit information (not shown) representing the number of the bits having a first logic value may be further added to the encoded first data EDATA1 [574 bits].

When the second data ODATA2 or EDATA2 is programmed in the second storage region, the controller 130 may check out the state of the second storage region, selectively invert the second data ODATA2 or EDATA2 based on the check-out result, and program the resultant data in the second storage region.

Referring to FIG. 7A, when the second data ODATA2 or EDATA2 is programmed in the second storage region, the ECC unit 138 may perform an ECC encoding operation to an original version of the second data ODATA2 or EDATA2 at step S701 and the operation manager 133 may program the ECC-encoded second data ODATA2 or EDATA2 in the second storage region at step S702. The steps S701 and S702 may include checking out the state of the second storage region where the second data ODATA2 or EDATA2 is to be programmed. Then it is checked out whether the number of error bits exceeds a predetermined threshold THB in the original and ECC-encoded version of the second data ODATA2 or EDATA2 by reading the original and ECC-encoded version of the second data ODATA2 or EDATA2 from the second storage region at step S703. The controller 130 may perform step S703 through comparison between the ECC-encoded and original version of the second data ODATA2 or EDATA2 when programmed into the second storage region at step S702 and the ECC-encoded and original version of second data ODATA2 or EDATA2 when currently read from the second storage region at step S703.

As a result of the verification operation at step S703, when the number of the error bits in the original and ECC-encoded version of the second data ODATA2 or EDATA2 is determined not to exceed the predetermined threshold THB at step S704, the original version of the second data ODATA2 or EDATA2 may be regarded as successfully programmed. In other words, the original version of the second data ODATA2 or EDATA2 may be possible to normally recover through an ECC decoding operation.

As a result of the verification at step S703, when the number of the error bits in the original and ECC-encoded version of the second data ODATA2 or EDATA2 is determined to exceed the predetermined threshold THB at step S704, the original version of the second data ODATA2 or EDATA2 may be regarded as programmed with intolerable errors. In other words, the original version of the second data ODATA2 or EDATA2 may be impossible to normally recover through an ECC decoding operation. Therefore, thus all the bits of the original version of the second data ODATA2 or EDATA2 may be inverted to become an inverted version of the second data ODATA2 or EDATA2, ECC-encoded and programmed again in the second storage region at steps S705 and S706.

Then, it is checked out whether the number of error bits exceeds the predetermined threshold THB in the inverted and ECC-encoded version of the second data ODATA2 or EDATA2 by reading the inverted and ECC-encoded version of the second data ODATA2 or EDATA2 from the second storage region at step S707. The controller 130 may perform step S707 through a comparison between the ECC-encoded and inverted version of the second data ODATA2 or EDATA2 when programmed into the second storage region at step S706 and the ECC-encoded and inverted version of the second data ODATA2 or EDATA2 when currently read from the second storage region at step S708.

As a result of the verification at step S707, when the number of the error bits in the inverted version of the second data ODATA2 or EDATA2 is determined not to exceed the predetermined threshold THB at step S708, the inverted version of the second data ODATA2 or EDATA2 may be regarded as successfully programmed. In other words, the inverted version of the second data ODATA2 or EDATA2 may be possible to normally recover through an ECC decoding operation.

As a result of the verification at step S707, when the number of the error hits in the inverted version of the second data ODATA2 or EDATA2 is determined to exceed the predetermined threshold THB at step S708, the program of the inverted version of the second data ODATA2 or EDATA2 may be regarded as a failure. In other words, the inverted version of the second data ODATA2 or EDATA2 may be impossible to normally recover through an ECC decoding operation.

Referring to FIGS. 7A and 7B, it is exemplified that a 512-bit data HOST DATA [512 bits] is inputted from the host 102 to the memory system 110 through the second interface 2ND_I/F. For example, the 512-bit data HOST DATA [512 bits] may be the second data ODATA2 [512 bits].

The second data ODATA2 [512 bits] may be transferred to the operation manager 133 through the second path P2.

The ECC unit 138 may perform an ECC encoding operation to an original version of the second data ODATA2 [512 bits] at step S701 and the operation manager 133 may program the original and ECC-encoded version of the second data ODATA2 [512 bits] in the second storage region at step S702.

To be specific, the operation manager 133 may generate a second flag bit INVERSION FLAG2 [1 bit] having a value '0' informing non-inversion of the second data ODATA2 [512 bits], and add the second flag bit INVERSION FLAG2 [1 bit] to the original version of the second data ODATA2 [512 bits]. Subsequently, the ECC unit 138 may perform an ECC encoding operation onto the flagged second data (ODATA2+INVERSION FLAG2 [513 bits]) and generate the ECC parity bits ECC PARITY [61 bits]. Subsequently, the operation manager 133 may program the original and ECC-encoded version of the second data EDATA2 [574 bits] which include the original version of the second data ODATA2 [512 bits], the second flag bit INVERSION FLAG2 [1 bit] and the ECC parity bits ECC PARITY [61 bits] in the second storage region of the non-volatile memory device 150.

Then, at step S703, the operation manager 133 may read the original and ECC-encoded version of the second data EDATA2 [574 bits] from the second storage region and decide whether to perform the inversion operation to the original version of the second data ODATA2 [512 bits] based on the number of the error bits in the original and ECC-encoded version of the second data EDATA2 [574 bits]. The controller 130 may perform step S703 through comparison between the ECC-encoded and original version of the second data EDATA2 [574 bits] when programmed into the second storage region at step S702 and the ECC-encoded and original version of second data EDATA2 [574 bits] when currently read from the second storage region at step S703.

Through step S703, it may be informed whether or not memory cells, to which the ECC-encoded and original version of the second data EDATA2 [574 bits] is programmed at step S702, are likely to be worn out and stuck in the second storage region. In general, a lifetime of the worn memory cell is running out. Also, data may be read out from the stuck memory cell while data cannot be programmed into the stuck memory cell.

Referring to FIG. 7C, it is not possible to find out exactly which memory cell is stuck in the second storage region, but memory cells storing the error bits, which is identified at each of steps S703 and S707, may be regarded as being stuck.

FIG. 7C exemplifies that 11 memory cells are stuck among 574 memory cells of the second storage region. FIG. 7C shows a 12-case table of a number of error bits in the original and ECC-encoded version of the second data ODATA2 or EDATA2 as a result of step S703 in the rightmost column.

Referring to FIG. 7C, as to first to sixth cases where the numbers of the error bits in the ECC-encoded and original version of the second data EDATA2 [574 bits] read at step S703 are sequentially 11 to 6, respectively. As a result of the verification at step S703, when the numbers of the error bits in the original and ECC-encoded version of the second data ODATA2 or EDATA2 are determined to exceed the predetermined threshold THB, for example 5, at step S704, the controller 130 may perform steps S705 to S707.

As a result of the verification at step S707, when the number of the error bits (for example, sequentially 0 to 5 for the first to sixth cases as illustrated in FIG. 7C) in the inverted and ECC-encoded version of the second data EDATA2 [574 bits] is determined not to exceed the predetermined threshold THB at step S708, the inverted version of the second data ODATA2 [512 bits] may be regarded as successfully programmed since the number of error bits of the inverted and ECC-encoded version of the second data EDATA2 [574 bits] are reduced is less than the predetermined threshold THB due to the inversion of the second data ODATA2 [512 bits].

As to seventh to twelfth cases where the numbers of the error bits in the ECC-encoded and original version of the second data EDATA2 [574 bits] read at step S703 are sequentially 5 to 0, respectively. As a result of the verification at step S703, when the numbers of the error bits in the ECC-encoded and original version of the second data EDATA2 [574 bits] are determined not to exceed the predetermined threshold THB, for example 5, at step S704, the original version of the second data ODATA2 [512 bits] may be regarded as successfully programmed and the controller 130 may end the process without further performing of steps S705 to S708.

Referring back to FIGS. 7A and 7B, as a result of the verification at step S703, when the number of the error bits in the original and ECC-encoded version of the second data EDATA2 [574 bits] is determined to exceed the predetermined threshold THB at step S704, the original version of the second data ODATA2 [512 bits] may be regarded as programmed with intolerable errors and thus all the bits of the original version of the second data ODATA2 [512 bits] may be inverted to become an inverted version of the second data ODATA2 [512 bits], ECC-encoded and programmed again in the second storage region at steps S705 and S706.

The ECC unit 138 may perform an ECC encoding operation to the inverted version of the second data ODATA2 [512 bits] at step S705 and the operation manager 133 may program the ECC-encoded second data ODATA2 [512 bits] in the second storage region at step S706.

To be specific the operation manager 133 may generate a second flag bit INVERSION FLAG2 [1 bit] having a value '1' informing inversion of the original version of the second data ODATA2 [512 bits], and add the second flag bit INVERSION FLAG2 [1 bit] to the inverted version of the second data ODATA2 [512 bits]. Subsequently, the ECC unit 138 may perform an ECC encoding operation onto the flagged second data (ODATA2+INVERSION FLAG2 [513 bits]) and generate the ECC parity bits ECC PARITY [61 bits]. Subsequently, the operation manager 133 may program the inverted and ECC-encoded version of the second data EDATA2 [574 bits] which include the inverted version of the second data ODATA2 [512 bits], the second flag bit INVERSION FLAG2 [1 bit] and the ECC parity bits ECC PARITY [61 bits] in the second storage region of the non-volatile memory device 150.

Then, at step S707, the operation manager 133 may read the inverted and ECC-encoded version of the second data EDATA2 [574 bits] from the second storage region and decide whether or not the program of the inverted version of the second data ODATA2 [512 bits] is successful based on the number of the error bits in the inverted and ECC-encoded version of the second data EDATA2 [574 bits]. The controller 130 may perform step S707 through comparison between the ECC-encoded and inverted version of the second data EDATA2 [574 bits] when programmed into the second storage region at step S706 and the ECC-encoded and inverted version of second data EDATA2 [574 bits] when currently read from the second storage region at step S707. When the controller 130 reads the first data ODATA1 or EDATA1 from the first storage region, the controller 130 may perform an ECC decoding onto the encoded first data EDATA1 that is read from the first storage region so as to produce the first data ODATA1, detect a first flag bit in the first data ODATA1, and selectively perform an inversion based on the detection result and output the result to the first interface 1ST_I/F. Herein, the first data ODATA1 may be transferred from the operation manager 133 to the first host interface 1322 through the first path P1, and outputted to the host 102 through the first interface 1ST_I/F.

Likewise, when the controller 130 reads the second data ODATA2 or EDATA2 from the second storage region, the controller 130 may perform an ECC decoding onto the encoded second data EDATA2 that is read from the second storage region so as to produce the second data ODATA2 detect a second flag bit in the second data ODATA2, and selectively perform an inversion based on the detection result and output the result to the second interface 2ND_I/F. Herein, the second data ODATA2 may be transferred from the operation manager 133 to the second host interface 1324 through the second path P2, and outputted to the host 102 through the second interface 2ND_I/F.

The read operation of the controller 130 may be described with reference to FIG. 8.

To be specific, referring to FIG. 8, the controller 130 may read the encoded first data EDATA1 or the encoded second data EDATA2 from the first storage region or the second storage region through the operation manager 133 in step S801.

Herein, the encoded first data EDATA1 and the encoded second data EDATA2 may include the ECC parity bits ECC PARITY [61 bits], as illustrated in FIGS. 6 to 7C, which are described above. Therefore, the controller 130 may perform an ECC decoding onto the encoded first data EDATA1 so as to generate a decoded first data ODATA1, and perform an ECC decoding onto the encoded second data EDATA2 so as to generate a decoded second data ODATA2 through the ECC unit 138 in step S802.

Herein, the decoded first data ODATA1 and the decoded second data ODATA2 may include the first flag bit INVERSION FLAG1 [1 bit] and the second flag bit INVERSION FLAG2 [1 bit], as illustrated in FIGS. 6 to 7C, which are described above. Therefore, the controller 130 may check out whether or not the decoded first data ODATA1 is in an inverted state, and when it turns out that the decoded first data ODATA1 is in an inverted state, the controller 130 may invert the decoded first data ODATA1 again and output it through the first path P1, and when it turns out that the decoded first data ODATA1 is not in an inverted state the controller 130 may not invert the decoded first data ODATA1 and output it as it is through the first path P1 through the operation manager 133 in step S803. Likewise, the controller 130 may check out whether the decoded second data ODATA2 is in an inverted state or not, and when it turns out that the decoded second data ODATA2 is in an inverted state, the controller 130 may invert the decoded second data ODATA2 again and output it through the second path. P2, and when it turns out that the decoded second data ODATA2 is not in an inverted state, the controller 130 may not invert the decoded second data ODATA2 and output it as it is through the second path P2 through the operation manager 133 in step S803.

Of course, the decoded first data ODATA1 for which whether to perform an inversion operation or not is decided and which is outputted through the first path P1 may be outputted to the first interface 1ST_I/F through the first host interface 1322 and transferred to the host 102. Likewise, the decoded second data ODATA2 for which whether to perform an inversion operation or not is decided and which is outputted through the second path P2 may be outputted to the second interface 2ND_I/F through the second host interface 1324 and transferred to the host 102.

FIGS. 9 to 17 are diagrams schematically illustrating application examples of the data processing system 100.

Figure 9:
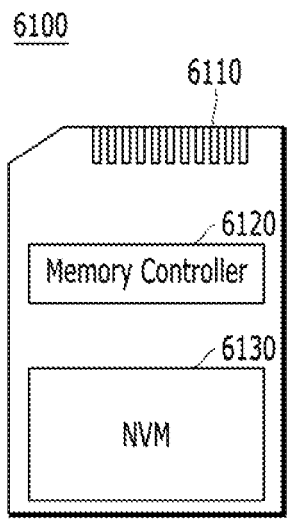
FIGS. 9 to 17 are diagrams schematically illustrating application examples of the data processing system shown in FIG. 1.

FIG. 9 is a diagram schematically illustrating another example of the data processing system 100. FIG. 9 schematically illustrates a memory card system to which the memory system in accordance with the present embodiment is applied.

Referring to FIG. 9 the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5 and perform the operations described in reference to FIGS. 5 to 8.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
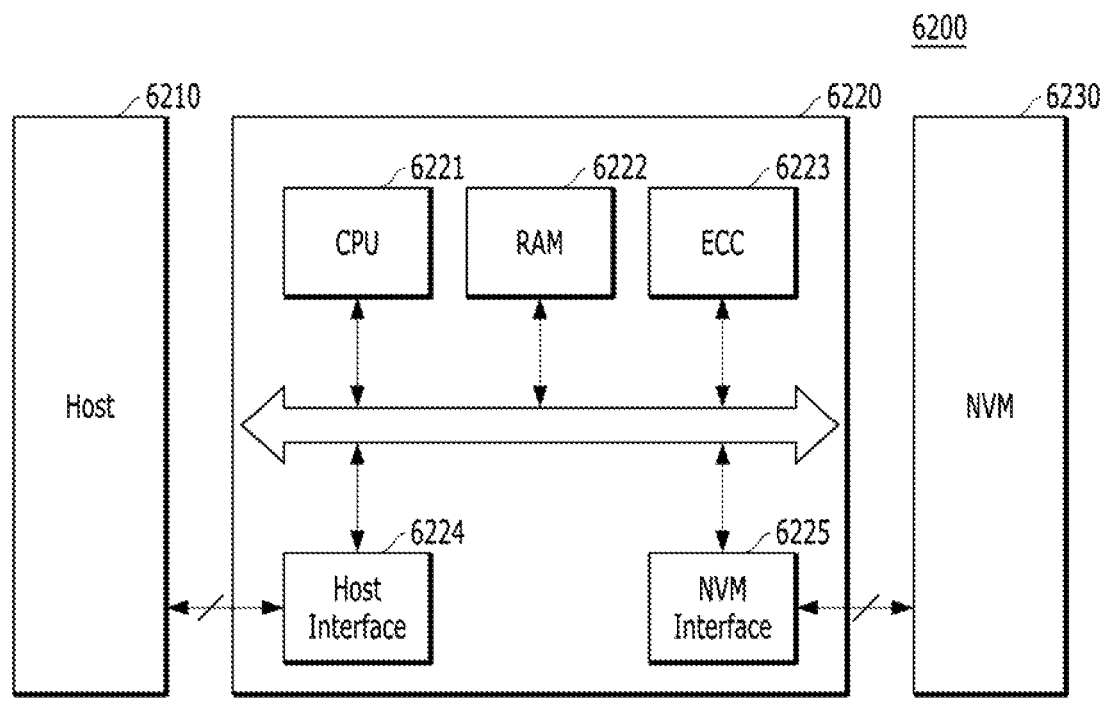

FIG. 10 is a diagram schematically illustrating another example of the data processing system including the memory system, in accordance with an embodiment of the present invention.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 and the memory controller 6220 may correspond to the memory device 150 and the memory controller 130 of the memory system 110 of FIGS. 1 to 8.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
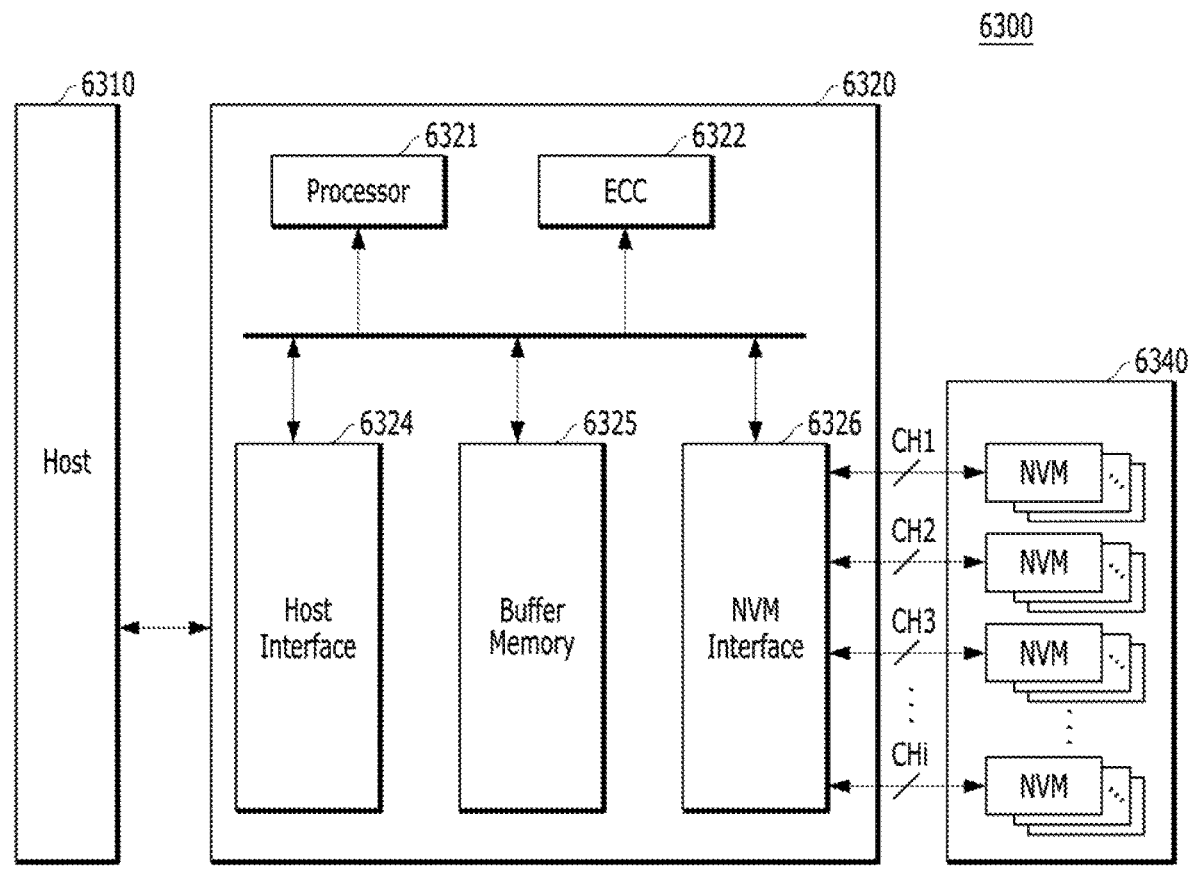

FIG. 11 is a diagram schematically illustrating another example of the data processing system including the memory system in accordance with an embodiment. FIG. 11 schematically illustrates an SSD including the memory system 110.

Referring to FIG. 11, the SSD 6300 may include a controller 6320 and a memory device 6340 including a plurality of nonvolatile memories. The controller 6320 may correspond to the controller 130 of the memory system 110 of FIGS. 1 to 8, and the memory device 6340 may correspond to the memory device 150 of the memory system of FIGS. 1 to 8.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 8 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300 and provide data read from the selected SSDs 6300 to the host 6310.

Figure 12:
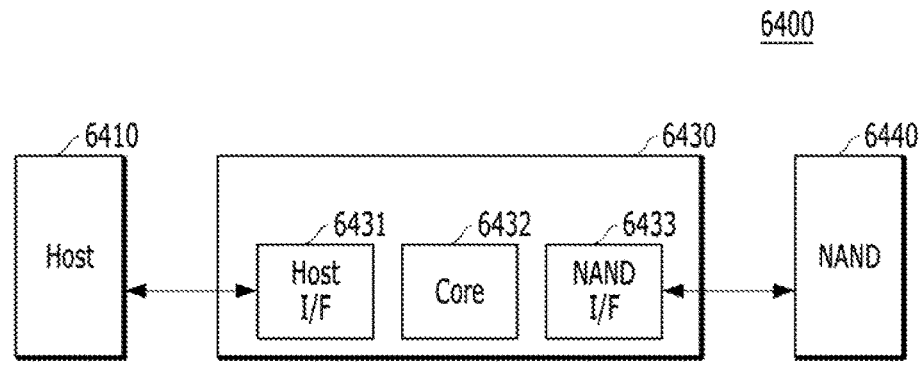

FIG. 12 is a diagram schematically illustrating another example of the data processing system including the memory system in accordance with an embodiment. FIG. 12 schematically illustrates an embedded Multi-Media Card (eMMC) including the memory system 110.

Referring to FIG. 12, the eMMC 6400 may include a controller 6430 and a memory device 6440 embodied by one or more NAND flash memories. The controller 6430 may correspond to the controller 130 of the memory system 110 of FIGS. 1 to 8, and the memory device 6440 may correspond to the memory device 150 of the memory system 110 of FIGS. 1 to 8.

More specifically the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including a memory system in accordance with an embodiment. Specifically, FIGS. 13 to 16 schematically illustrate UFS (Universal Flash Storage) systems each including the memory system 110.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 of FIGS. 1 to 8. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
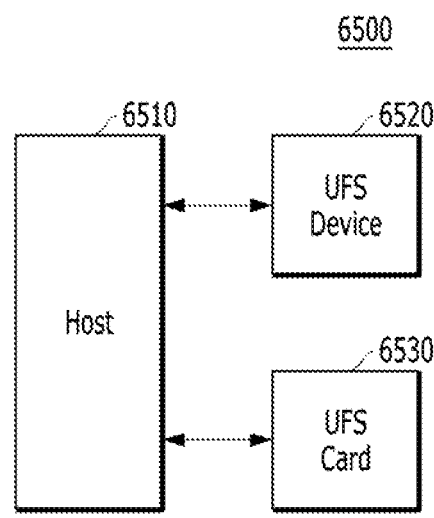

In the UFS system 6500 illustrated in FIG. 13 each of the host 6510, the UFS device 6520 and the UFS card 6530 may include UniPro. The host 6510 may perform a switching operation in order to communicate with the UFS device 6520 and the UFS card 6530. In particular the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
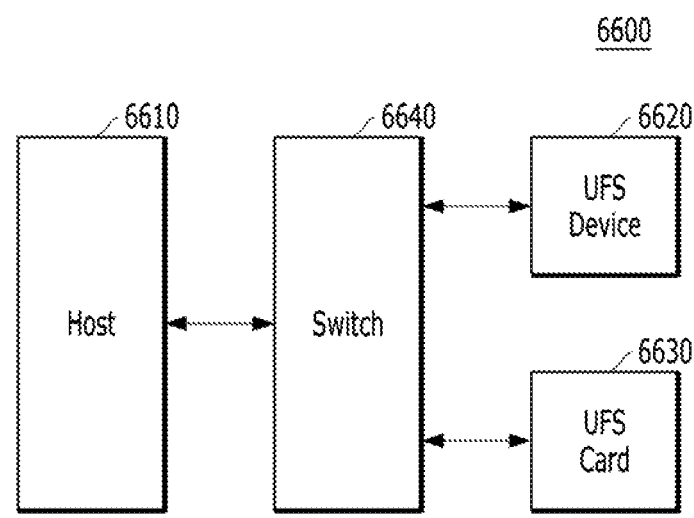

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
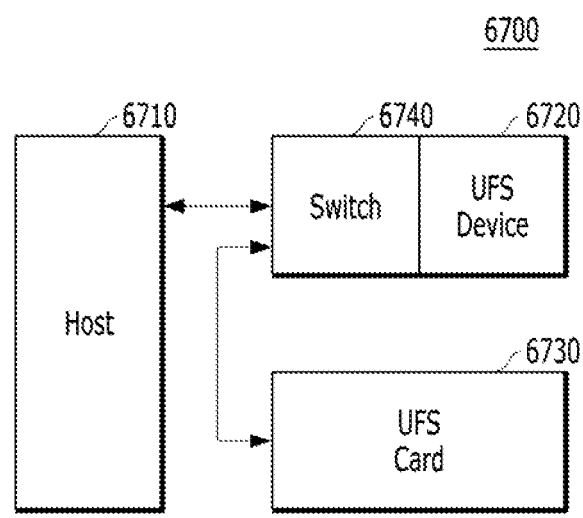

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
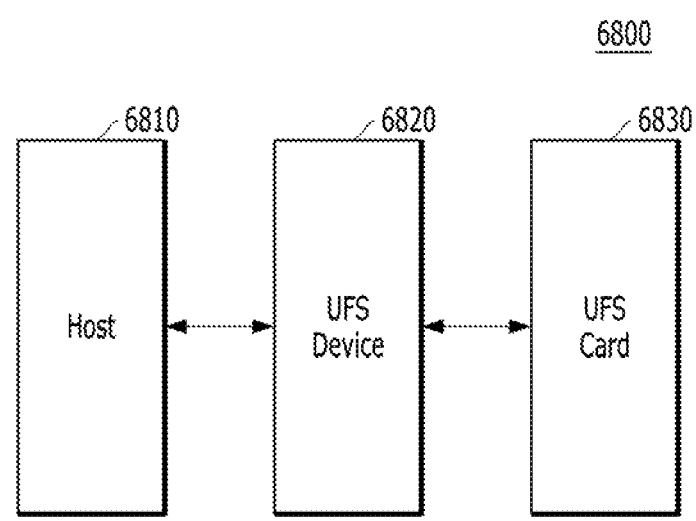

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
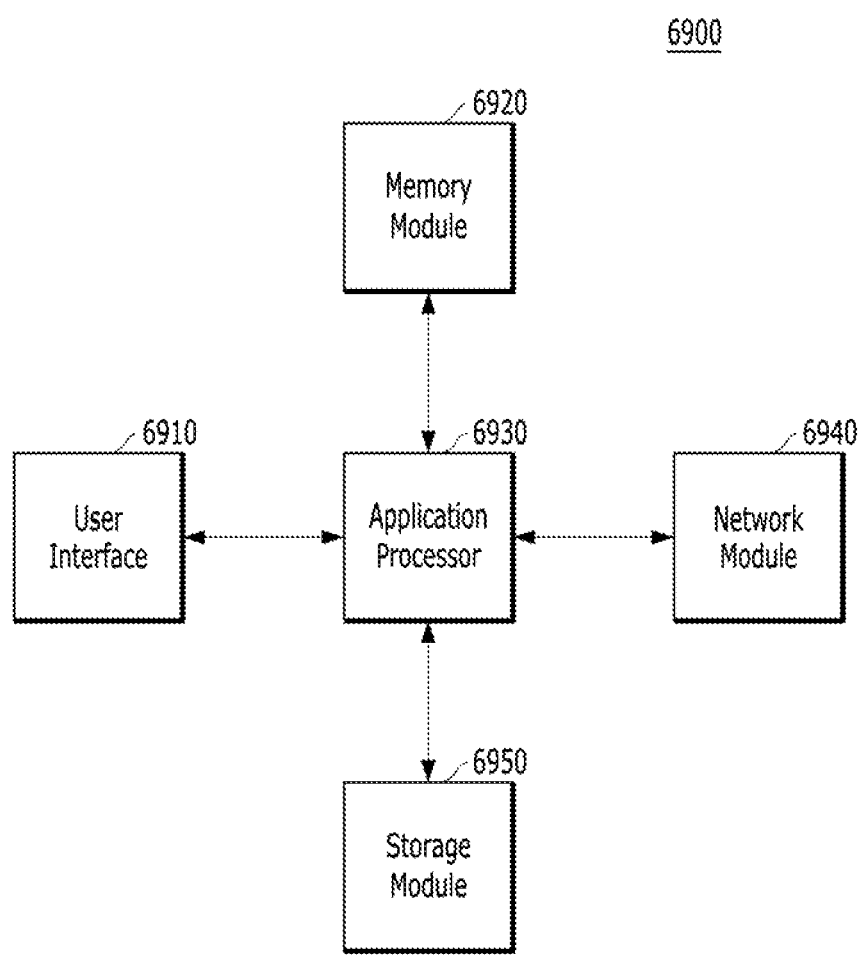

FIG. 17 is a diagram schematically illustrating another example of the data processing system including a memory system in accordance with an embodiment. FIG. 17 schematically illustrates a user system including the memory system 110.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM ReRAM, MRAM or FRAM. For example, the application processor 6930 and the memory module 6920 may be packaged and mounted, based on Package on Package (POP).

The network module 6940 may communicate with external devices. For example the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data provided from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 8. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 to 8 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, a memory system may include a first interface and a second interface for inputting/outputting data that are inputted/outputted to/from a non-volatile memory device into a host. A portion of the non-volatile memory device may use the first interface to control data to be inputted/outputted to/from the host and the other portion of the non-volatile memory device may use the second interface to control data to be inputted/outputted to/from the host. In this way, it becomes possible to use one non-volatile memory device for two purposes of usage simultaneously.

Also, when a data is programmed in a portion of the non-volatile memory device, the value of the data is detected and then the value of the data may be selectively inverted based on the detection result and programmed. When a data is programmed in the other portion of the non-volatile memory device, the state of the portion is detected and then the value of the data may be selectively inverted based on the state detection result and programmed. In this way, it is possible to reduce the amount of power consumption used for storing the data in the non-volatile memory device, and reduce an error occurring rate.

In addition, the capacity occupied by a portion of the non-volatile memory device and the capacity occupied by the other portion of the non-volatile memory device may be variably applied based on the extent that the first interface and the second interface are used individually. In this way, the lifespan of the non-volatile memory device may be elongated and the usage of the non-volatile memory device may be expanded.

While, the present invention has been described with respect to specific embodiments, it will be apparent to those skilled in the art that various changes and modifications may be made without departing from the spirit and scope of the invention as defined in the following claims.

What is claimed is:

1. A memory system comprising:
   a non-volatile memory device including a first storage region and a second storage region; and
   a controller including a first interface and a second interface which are individually coupled to a host for transferring data between the host and the non-volatile memory device, and suitable for transferring first data through the first interface, and transferring second data distinguishable from the first data through the second interface,
   wherein the controller programs the first data into the first storage region by selectively inverting the first data according to bit values of the first data inputted from the host through the first interface, and
   wherein the controller programs the second data into the second storage region by selectively inverting the second data inputted from the host through the second interface according to status of memory cells in the second storage region, into which the second data is programmed,
   wherein the controller further checks a status of the first storage region at a predetermined cycle or at an occurrence of a predetermined event, and further variably changes storage capacities of the first and second storage regions based on a result of the checking of the status of the first storage region.

2. The memory system of claim 1, wherein the controller programs the first data into the first storage region by inverting the first data when bits having a first value are a majority in the first data.

3. The memory system of claim 2,
   wherein the controller programs the first data into the first storage region by further adding a first flag bit to the first data, and
   wherein the first flag bit represents the inversion of the first data.

4. The memory system of claim 3, wherein the controller further read the stored first data from the first storage region by selectively inverting the read first data according to the first flag bit added to the read first data.

5. The memory system of claim 1,
   wherein the controller further checks the status of the memory cells in the second storage region by:
   programming the second data into the second storage region without the inversion of the second data;
   reading the stored second data from the second storage region; and
   comparing the second data at the time of the programming with the read second data, and
   wherein the controller further decides whether to invert the second data according to a number of different bits between the second data at the time of the programming and the read second data.

6. The memory system of claim 5, wherein the controller ends the programming of the second data when the number of different bits is equal to or less than a predetermined threshold.

7. The memory system of claim 5, wherein the controller programs the second data into the second storage region by inverting the second data when the number of different bits exceeds the predetermined threshold.

8. The memory system of claim 7,
   wherein the controller further reads the inverted and stored second data from the second storage region, and further compares the inverted second data at the time of the programming with the read inverted second data, and
   wherein the controller decides the programming of the inverted second data as successful when a number of different bits between the inverted second data at the time of the programming and the read inverted second data is equal to or less than the predetermined threshold.

9. The memory system of claim 7,
   wherein the controller programs the second data into the second storage region by further adding a second flag bit to the second data, and
   wherein the second flag bit represent the inversion of the second data.

10. The memory system of claim 9, wherein the controller further read the stored second data from the second storage region by selectively inverting the read second data according to the second flag bit added to the read second data.

11. The memory system of claim 1,
    wherein each of the first and second storage region includes a plurality of storage segments,
    wherein the controller assigns one or more degraded storage segments of the first storage region as the second storage region, and
    wherein the degraded storage segment is one, data read from which has greater number of errors than a threshold number of errors.

12. The memory system of claim 11,
    wherein the controller assigns one or more improved storage segments of the second storage region as the first storage region, and
    wherein the improved storage segment is one, data read from which has less number of errors than the threshold number of errors.

13. The memory system of claim 1, wherein the controller includes:
    a clock generator suitable for generating a first clock having a relatively high frequency and a second clock having a relatively low frequency; and a transferor suitable for inputting/outputting an input/output data of the first storage region to/from the host through the first interface that operates in response to the first clock, and inputting/outputting an input/output data of the second storage region to/from the host through the second interface that operates in response to the second clock.

14. The memory system of claim 13, wherein the first interface is one interface among a Dual In-line Memory Module (DIMM) interface and a Peripheral Component Interconnect Express (PCI-e) interface, and the second interface is one interface among a Dual In-line Memory Module (DIMM) interface and a Peripheral Component Interconnect Express (PCI-e) interface.

15. The memory system of claim 1,
wherein the first storage region is a main memory of the host, and
wherein the second storage region is a storage of the host.

16. The memory system of claim 1, wherein the non-volatile memory device is one memory selected from a group including a flash memory, a Phase Change Random Access Memory (PCRAM), a Resistive Random Access Memory (RRAM), a ferroelectric random access memory (FRAM), and a Spin Transfer Torque Random Access Memory (STT-MRAM).

* * * * *